(12) United States Patent
Matheson

(10) Patent No.: US 11,109,567 B2
(45) Date of Patent: Sep. 7, 2021

(54) SPLASH-GUARD SYSTEM AND METHOD

(71) Applicant: Sherry Lynn Matheson, Kincardine (CA)

(72) Inventor: Sherry Lynn Matheson, Kincardine (CA)

( * ) Notice: Subject to any disclaimer, the term of this patent is extended or adjusted under 35 U.S.C. 154(b) by 825 days.

(21) Appl. No.: 15/947,599

(22) Filed: Apr. 6, 2018

(65) Prior Publication Data

US 2019/0307101 A1    Oct. 10, 2019

(51) Int. Cl.
*A01K 5/01* (2006.01)
*A01K 7/00* (2006.01)

(52) U.S. Cl.
CPC ............ *A01K 5/0135* (2013.01); *A01K 7/005* (2013.01)

(58) Field of Classification Search
CPC ............................... A01K 5/0135; A01K 7/005
See application file for complete search history.

(56) References Cited

U.S. PATENT DOCUMENTS

| | | | |
|---|---|---|---|
| 1,114,264 A * | 10/1914 | Hoyle | A01K 45/002 |
| | | | 119/69.5 |
| 3,734,062 A | 5/1973 | O'Hara | |
| 5,207,182 A | 5/1993 | Lorenzana | |
| 5,738,039 A | 4/1998 | Berman et al. | |
| 5,884,582 A | 3/1999 | Duckworth | |
| 6,142,101 A | 11/2000 | Pelsor | |
| 7,270,082 B2 | 9/2007 | Plante | |
| 7,600,486 B2 | 10/2009 | Ellis | |
| 7,938,083 B1 * | 5/2011 | Huether | A01K 5/0114 |
| | | | 119/61.5 |
| 9,137,968 B2 | 9/2015 | Veness et al. | |
| 9,258,979 B2 | 2/2016 | Alexander | |
| 9,668,455 B1 | 6/2017 | Carmichael et al. | |
| 10,524,451 B1 * | 1/2020 | Sciortino | A01K 5/0135 |
| 10,918,079 B1 * | 2/2021 | Mora | F16H 25/20 |
| 2007/0074669 A1 | 4/2007 | Montague | |
| 2007/0095296 A1 * | 5/2007 | Zuccaro | A01K 5/0135 |
| | | | 119/61.5 |
| 2007/0272163 A1 | 11/2007 | Leary | |
| 2008/0314326 A1 | 12/2008 | Albert | |
| 2009/0241843 A1 * | 10/2009 | Becattini, Jr. | A01K 7/005 |
| | | | 119/51.5 |
| 2010/0180827 A1 * | 7/2010 | Becattini, Jr. | A01K 5/0135 |
| | | | 119/61.54 |
| 2017/0280676 A1 | 10/2017 | Mendez | |
| 2018/0014504 A1 * | 1/2018 | Grinnell | A01K 5/0114 |
| 2018/0125029 A1 * | 5/2018 | Vithala | A01K 5/0135 |
| 2018/0242553 A1 * | 8/2018 | Nemeth | B65D 43/0204 |
| 2020/0288669 A1 * | 9/2020 | Maring-Teichmann | |
| | | | A01K 5/0135 |
| 2021/0137070 A1 * | 5/2021 | Harper | A01K 5/01 |

FOREIGN PATENT DOCUMENTS

| | | | | |
|---|---|---|---|---|
| DE | 202020002234 U1 * | 9/2020 | | A01K 5/0135 |
| KR | 20130047141 A * | 5/2013 | | |
| KR | 20200132233 A * | 11/2020 | | |

* cited by examiner

*Primary Examiner* — Magdalena Topolski

(57) ABSTRACT

A splash-guard system; the splash-guard system includes a guard-member, a base-member, and a mat. The splash-guard system is useful for confining splashes or spills from a pet bowl to the splash-guard system such that a pet owner does not need to regularly clean the surrounding area of the pet bowl when a pet makes a mess when feeding. The splash-guard system serves to prevent constant cleaning and damage to the surrounding floor and walls.

15 Claims, 5 Drawing Sheets

SPLASH-GUARD SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of pet feeding systems of existing art and more specifically relates to a splash-guard for pet food and water.

RELATED ART

Pets (i.e., canines, felines, and the like) generally receive (eat/drink) food and water from bowls placed on the ground. Oftentimes, pets create messes by misplacing food and water out of their bowls onto the surrounding floor and walls, or they splash water onto the floor and surrounding area while feeding. Pet owners are regularly tasked with cleaning the surrounding areas after each feeding. Furthermore, pets often slide their pet bowl around during feeding causing the pet bowl to move to undesired locations, particularly on non-friction floor surfaces (i.e. tile, laminate, etc.). Therefore, a suitable solution is required.

U.S. Pat. No. 3,734,062 to O'Hara, J. relates to a non-spilling dish for dogs and the like. The described non-spilling dish for dogs and the like includes an animal feeding and watering dish device. This device consists primarily of a bowl like structure within integral and recessed flanging for catching food and water when the pet is being fed.

SUMMARY OF THE INVENTION

In view of the foregoing disadvantages inherent in the known splash-guard for pet food and water device art, the present disclosure provides a novel splash-guard system and method. The general purpose of the present disclosure, which will be described subsequently in greater detail, is to provide a splash-guard system and means for confining water and food splashes from a pet bowl and preventing water and food from contacting the surrounding area.

A splash-guard system is disclosed herein. The splash-guard system includes a guard-member including a first-sidewall defining a first-interior-volume. The first-sidewall may form an external-flange around a peripheral of the first-sidewall. The splash-guard system may further include a base-member positioned under the guard-member; the base-member having a second-sidewall and a base defining a second-interior-volume, and an exterior-lip around a peripheral of the second-sidewall opposite of the base. The external-flange may be configured to provide a generally sealed connection surface with the exterior-lip. To inhibit movement of the guard-member and the base-member a mat may be configured to provide a friction-surface under the base-member. The guard-member and the base-member are configured to receive a pet bowl such that 'splashes' are confined therein.

According to another embodiment, a method of using a splash-guard system is also disclosed herein. The method of using the splash-guard system includes providing a splash-guard system as described above; placing the base-member on the mat; placing the pet bowl on the base of the base-member; and placing the guard-member around the pet bowl; the external-flange providing the generally sealed connection surface with the exterior-lip.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a splash-guard system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a splash-guard for pet food and water and more particularly to a splash-guard system and method as used to prevent water or food from contacting the surrounding area of a pet bowl.

Generally, the splash-guard system prevents a pet owner from having to clean the surrounding area of a pet bowl caused by splashes or spills that a pet may create. When feeding, the pet can easily displace food, and particularly water, to the floors or walls around the pet bowl. The present disclosure may be useful in confining the splashes or spills made by the pet, which could otherwise damage the surrounding areas, such as floors or walls. The splash-guard system is easy to clean, assemble/disassemble, and includes light-weight features for a safer handling. A variety of colors and designs may be included with the splash-guard system to match the surrounding décor of a home, office, yard, etc.

Referring now more specifically to the drawings by numerals of reference, there is shown in FIGS. 1-4, various views of a splash-guard system 100.

Figure 1:
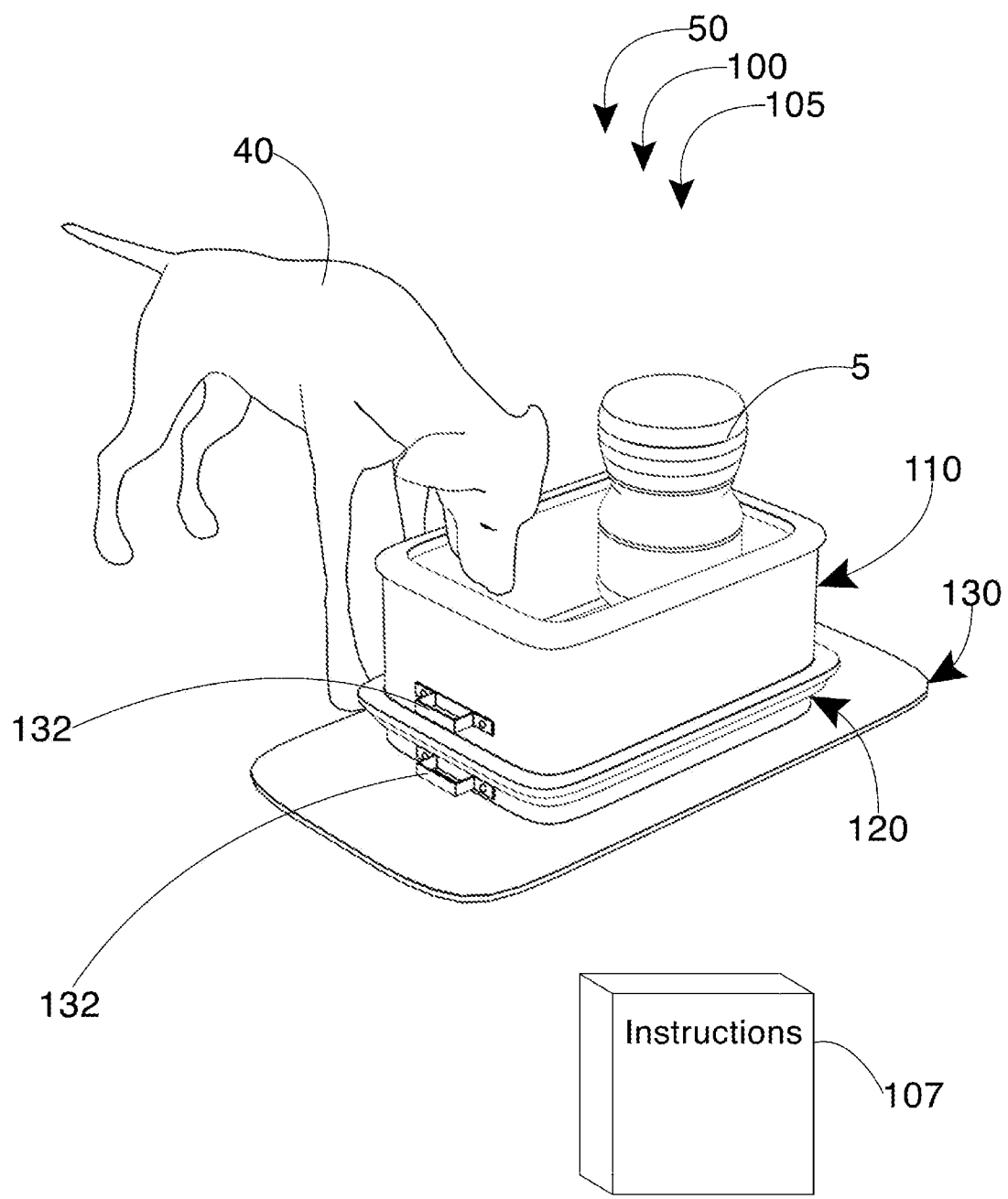
FIG. 1 is a perspective view of the splash-guard system during an 'in-use' condition, according to an embodiment of the disclosure.

FIG. 1 shows a splash-guard system 100 during an 'in-use' condition 50, according to an embodiment of the present disclosure. Here, the splash-guard system 100 may be beneficial for use by a user 40 to prevent a messy clean-up of the surrounding area (i.e., floors, walls, and the like) of a pet bowl 5. As illustrated, the splash-guard system 100 may include a guard-member 110 having a first-sidewall 112 defining a first-interior-volume 114. The first-sidewall 112 may form an external-flange 116 around a peripheral of the first-sidewall 112. The splash-guard system 100 may further include a base-member 120 positioned under the guard-member 110, the base-member 120 having a second-sidewall 122 and a base 124 defining a second-interior-volume 126, and an exterior-lip 128 around a peripheral of the second-sidewall 122 opposite of the base 124. The external-flange 116 may be configured to provide a generally sealed connection surface with the exterior-lip 128. The external-flange 116 and the exterior-lip 128 may be integrally formed therefrom the first-sidewall 112 and the second-sidewall 122, respectively.

To inhibit movement of the guard-member 110 and the base-member 120, a mat 130 may be configured to provide a friction-surface under the base-member 120. The guard-member 110 and the base-member 120 are configured to receive the pet bowl 5 such that splashes are confined therein.

The guard-member 110 may be configured to confine spills from the pet bowl 5 within the second-interior-volume 126 of the base-member 120. The guard-member 110 and the base-member 120 may be rigid to inhibit the pet 40 from easily moving the splash-guard system 100 aside. The guard-member 110, the base-member 120, and the mat 130 may comprise of a material that is reusable and washable.

According to one embodiment, the splash-guard system 100 may be arranged as a kit 105. In particular, the splash-guard system 100 may further include a set of instructions 107. The instructions 107 may detail functional relationships in relation to the structure of the splash-guard system 100 such that the splash-guard system 100 can be used, maintained, or the like, in a preferred manner.

The guard-member 110, the base-member 120, (which is preferably slightly heavier than guard-member 120, to inhibit movement, and the mat 130 may be arranged to be readily assembled and disassembled with no additional pieces required of the kit 105. However, if desired, fasteners 138 (FIG. 4) may be provided and configured to affix the base-member 120 to the mat. 130 (or optionally the mat 130 to a floor-surface), not shown. The fasteners 138 may comprise of hook-and-loop strips (such as VELCRO®) or other suitable fasteners known in the art. In certain embodiments no fasteners 138 may be used.

Figure 2:
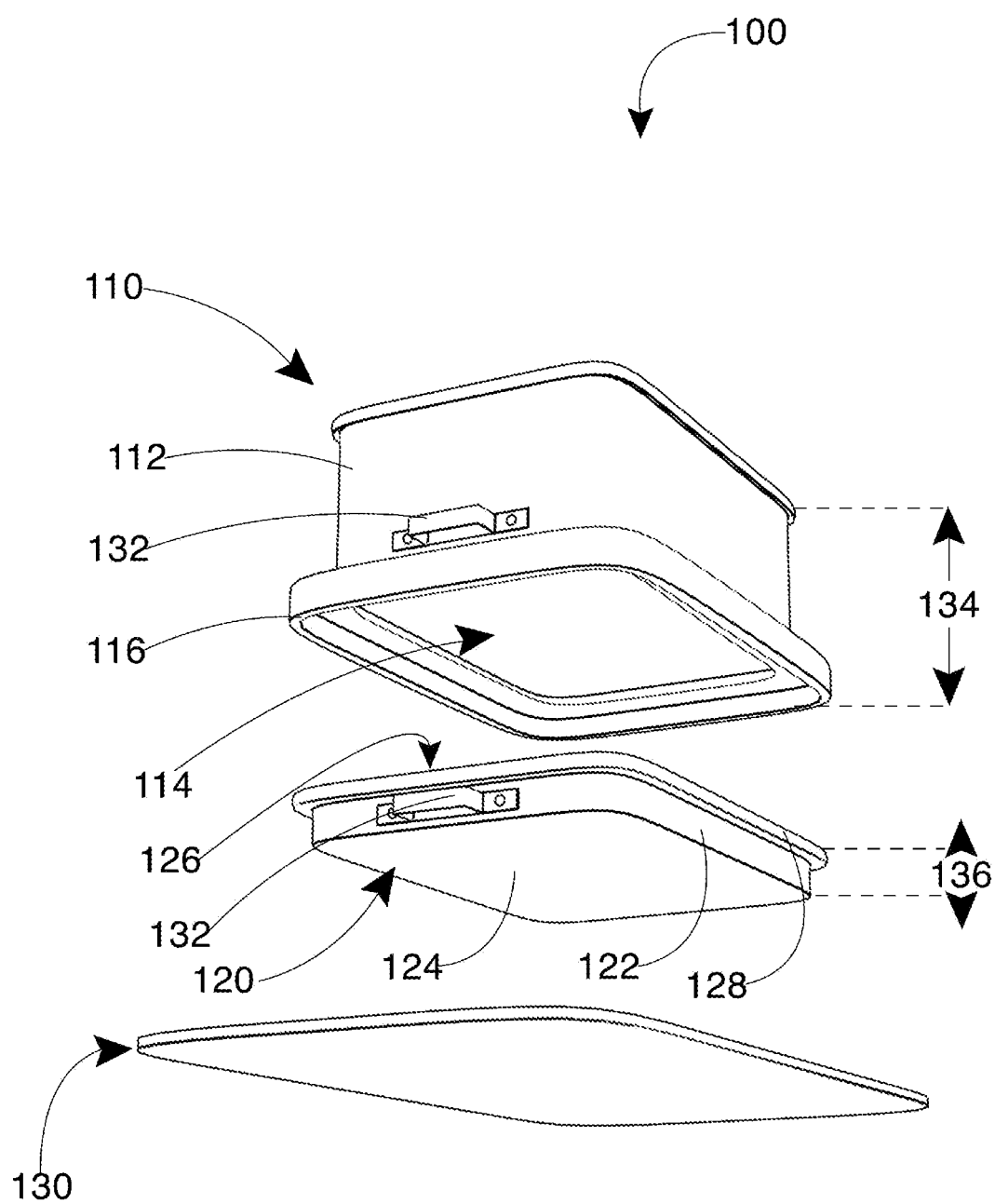
FIG. 2 is an exploded view of the splash-guard system of FIG. 1, according to an embodiment of the present disclosure.

FIG. 2 shows the splash-guard system 100 of FIG. 1, according to an embodiment of the present disclosure. As above, the splash-guard system 100 may include the guard-member 110 having the first-sidewall 112 defining the first-interior-volume 114. The first-sidewall 112 may form the external-flange 116 around the peripheral of the first-sidewall 112. The splash-guard system 100 may further include the base-member 120 positioned under the guard-member 110, the base-member 120 having the second-sidewall 122 and the base 124 defining the second-interior-volume 126, and the exterior-lip 128 around the peripheral of the second-sidewall 122 opposite of the base 124. The external-flange 116 may be configured to provide the generally sealed connection surface with the exterior-lip 128. A first-height 134 corresponding to the first-sidewall 112 may be greater than a second-height 136 corresponding to the second-sidewall 122, such that the first-interior-volume 114 is greater than the second-interior-volume 126.

To inhibit movement of the guard-member 110 and the base-member 120, the mat 130 may be provided and configured to provide the friction-surface under the base-member 120. The guard-member 110 and the base-member 120 may be configured to receive the pet bowl 5 such that splashes are confined therein.

The guard-member 110 and the base-member 120 each include a pair of handles 132 attached to an exterior-side of the first-sidewall 112 and the second-sidewall 122, respectively. The pair of handles 132 may be located at two opposed locations. The pair of handles 132 are configured to provide a safer handling of the guard-member 110 and the base-member 120. For an additional safer handling, the guard-member 110 and the base-member 120 may comprise of light-weight material (i.e., aluminum, titanium, or other suitable known material in the art).

The guard-member 110 may include a first-general-shape that dimensionally corresponds to a second-general-shape of the base-member 120 and configured to enable the external-flange 116 to engage the external-lip 128. The first-general-shape and the second-general-shape can be substantially three-dimensional rectangular. However, to anticipate the variety of shapes in the pet bowl 5, the first-general-shape and the second-general-shape may be modified to accommodate to other shapes.

Figure 3:
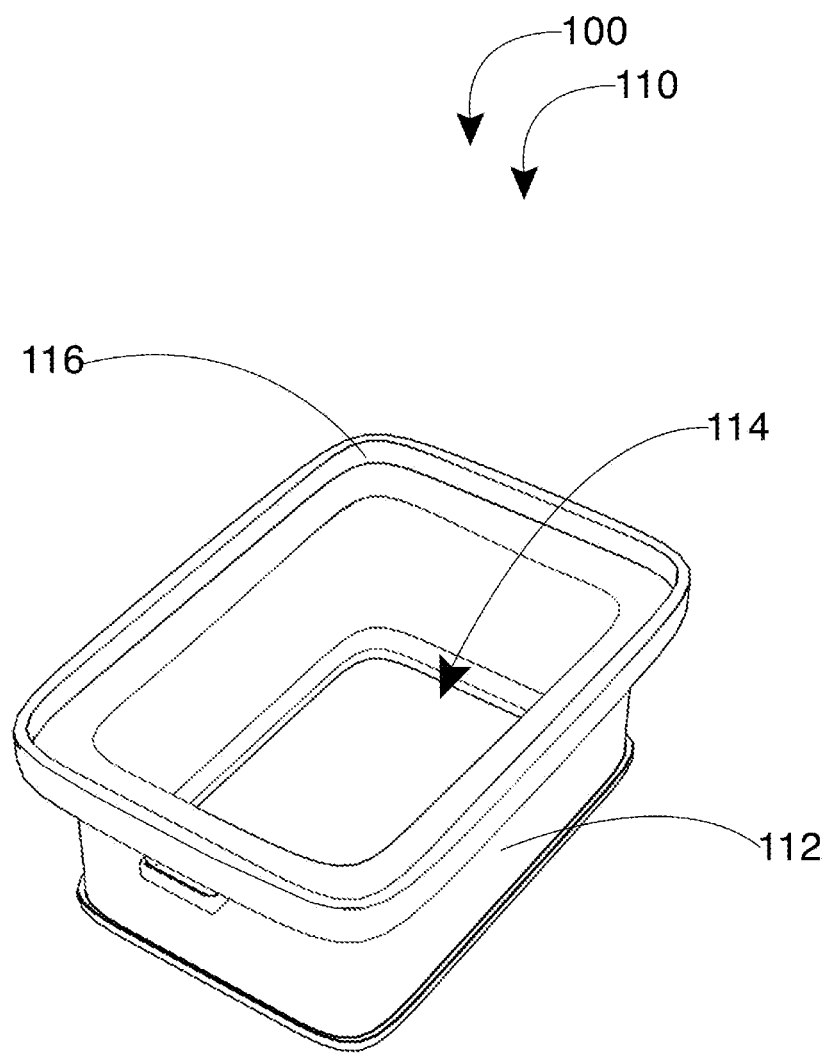
FIG. 3 is a bottom-perspective view of the splash-guard system of FIG. 1, according to an embodiment of the present disclosure.

Referring now to FIG. 3, a perspective view of the splash-guard system 100 of FIG. 1, according to an embodiment of the present disclosure. The guard-member 110 may include the external-flange 116 configured to provide the generally sealed connection surface with the exterior-lip 128. As shown, the external-flange 116 may include an L-shaped cross-section. Additional fasteners or clips are not needed in the present embodiment.

Figure 4:
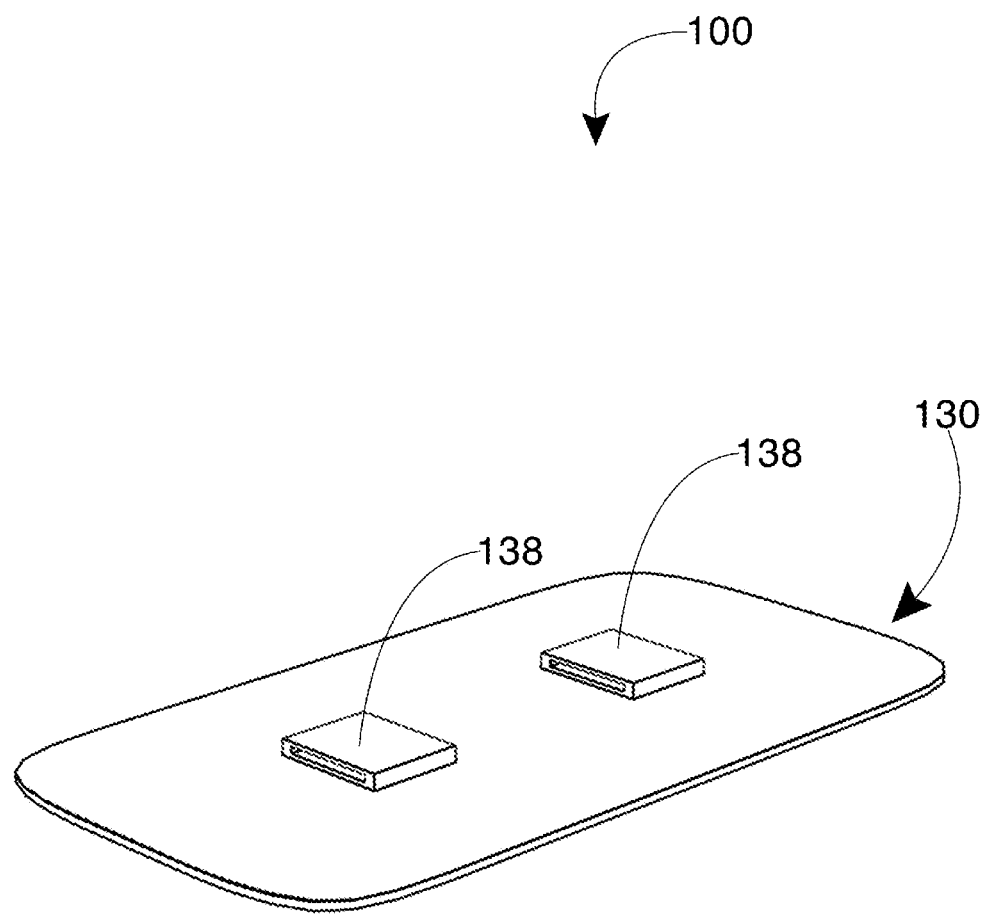
FIG. 4 is a perspective view of the splash-guard system of FIG. 1, according to an embodiment of the present disclosure.

FIG. 4 is a perspective view of the splash-guard system 100 of FIG. 1, according to an embodiment of the present disclosure. As shown, the mat 130 may be included with the splash-guard system 100 and is configured to provide the friction-surface under the base-member 120. The friction-surface may be understood to include non-slip elements inhibiting the base-member 120 and the mat 130 from movement and to protect the floor surface from condensation gathering thereon. The non-slip elements may include a particular material (i.e. rubber) or other known methods. In one embodiment, the mat 130 may be generally rectangular to match that of the first-general-shape and the second-general-shape (FIG. 2). However, the mat 130 may be included in other shapes and sizes.

Figure 5:
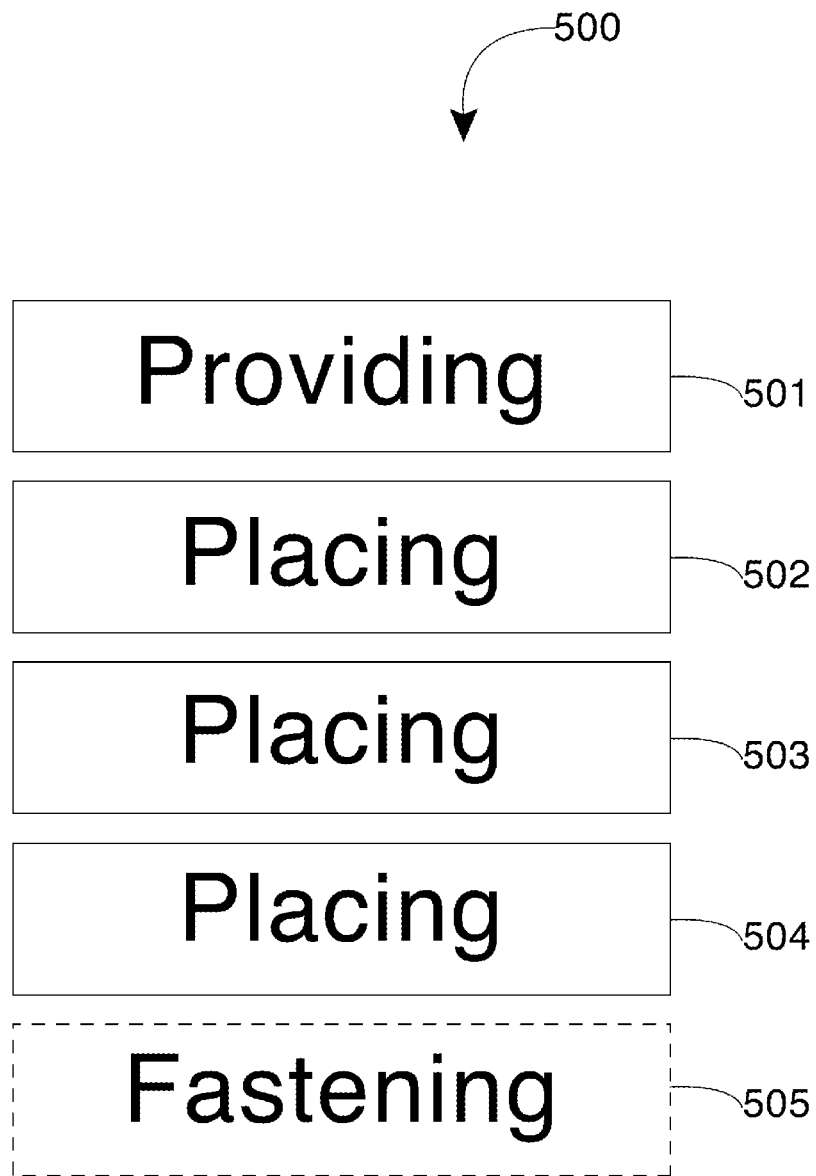
FIG. 5 is a flow diagram illustrating a method of using a splash-guard system, according to an embodiment of the present disclosure.

Referring now to FIG. 5 showing a flow diagram illustrating a method for using a splash-guard system 500, according to an embodiment of the present disclosure. In particular, the method for using the splash-guard system 500 may include one or more components or features of the splash-guard system 100 as described above. As illustrated, the method for method of using the splash-guard system 500 may include the steps of: step one 501, providing a splash-guard system 100 having a guard-member 110 including, a first-sidewall 112 defining a first-interior-volume 114, the first-sidewall 112 forming an external-flange 116 around a peripheral of the first-sidewall 112; a base-member 120 positioned under the guard-member 110, the base-member 120 including, a second-sidewall 122 and a base 124 defining a second-interior-volume 126, and an exterior-lip 128 around a peripheral of the second-sidewall 122 opposite of the base 124; and a mat 130 configured to provide a friction-surface; step two 502, placing the base-member 120 on the mat 130; step three 503, placing a pet bowl 5 on the base 124 of the base-member 120; step four 504, placing the guard-member 110 around the pet bowl 5, the external-flange 116 providing a generally sealed connection surface with the exterior-lip 128; step five 505, fastening the mat 130 to the base-member 120 via a fastener 138.

It should be noted that step 505 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for confining splashes form the pet bowl 5 [NOTE: e.g., different step orders within above-mentioned list, elimination or addition of certain steps, including or excluding certain maintenance steps, etc.], are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A method of using a splash-guard system for feeding or watering a pet, the method consisting essentially of:
   providing the splash-guard system consisting essentially of a guard-member including, a first-sidewall defining a first-interior-volume, said first-sidewall forming an external-flange around a bottom peripheral of said first-sidewall; a base-member positioned under said guard-member, said base-member including, a second-sidewall and a base defining a second-interior-volume, and an exterior-lip around a top peripheral of said second-sidewall opposite of said base; and a mat configured to provide a friction-surface,
   placing said base-member on said mat,
   fastening said mat to said base member via a fastener,
   placing a pet bowl on said base of said base-member,
   placing pet food or liquid within said pet bowl, and
   placing said guard-member around said pet bowl, said external-flange providing a sealed connection surface with said exterior-lip.

2. The method of claim 1, wherein said guard-member and said base-member each include a pair of handles attached to an exterior-side of said first-sidewall and said second-sidewall, respectively.

3. The method of claim 2, wherein said pair of handles are located at two opposed locations.

4. The method of claim 1, wherein said guard-member and said base-member comprise of light-weight material.

5. The method of claim 1, wherein said guard-member is configured to confine spills from said pet bowl within said second-interior-volume of said base-member.

6. The method of claim 1, wherein said guard-member and said base-member is rigid.

7. The method of claim 1, wherein said external-flange and said exterior-lip are integrally formed therefrom said first-sidewall and said second-sidewall, respectively.

8. The method of claim 1, wherein said external-flange includes an L-shaped cross-section.

9. The method of claim 1, wherein said guard-member includes a first-general-shape that dimensionally corresponds to a second-general-shape of said base-member configured to enable said external-flange to engage said external-lip.

10. The method of claim 9, wherein said first-general-shape and said second-general-shape are substantially three-dimensional rectangular.

11. The method of claim 1, wherein a first-height corresponding to said first-sidewall is greater than a second-height corresponding to said second-sidewall.

12. The method of claim 1, further comprising the step of removing said mat from said base and reassembling the splash-guard system with another mat.

13. The method of claim 1, wherein said guard-member, said base-member, and said mat comprise of a material that is reusable and washable.

14. The method of claim 1, wherein said mat is generally rectangular.

15. The method of claim 1, wherein said fasteners comprise of hook-and-loop strips.

\* \* \* \* \*